(12) United States Patent
Minami

(10) Patent No.: US 9,000,724 B2
(45) Date of Patent: Apr. 7, 2015

(54) VEHICLE BATTERY COOLING DEVICE

(75) Inventor: Hiromasa Minami, Shizuoka-ken (JP)

(73) Assignee: Suzuki Motor Corporation (JP)

( * ) Notice: Subject to any disclaimer, the term of this patent is extended or adjusted under 35 U.S.C. 154(b) by 282 days.

(21) Appl. No.: 13/637,710

(22) PCT Filed: Mar. 7, 2011

(86) PCT No.: PCT/JP2011/055195
§ 371 (c)(1),
(2), (4) Date: Sep. 27, 2012

(87) PCT Pub. No.: WO2011/145380
PCT Pub. Date: Nov. 24, 2011

(65) Prior Publication Data
US 2013/0049688 A1     Feb. 28, 2013

(30) Foreign Application Priority Data

May 19, 2010     (JP) .................................. 2010-114982

(51) Int. Cl.
*H01M 10/50*     (2006.01)
*B60H 1/00*      (2006.01)
(Continued)

(52) U.S. Cl.
CPC ...... *B60H 1/00278* (2013.01); *B60H 2001/003* (2013.01); *B60L 1/003* (2013.01); *B60L 11/1874* (2013.01); *B60L 11/1877* (2013.01); *B60L 2210/12* (2013.01); *H01M 10/46* (2013.01); *H01M 10/5016* (2013.01); *H01M 10/5063* (2013.01); *Y02T 10/7005* (2013.01);
(Continued)

(58) Field of Classification Search
CPC . B60L 2240/34; B60L 2210/12; B60L 1/003; Y02T 10/7005; B60H 1/00278; B60H 2001/003
See application file for complete search history.

(56) References Cited

U.S. PATENT DOCUMENTS 5,490,572 A * 2/1996 Tajiri et al. .................... 180/65.1
5,624,003 A * 4/1997 Matsuki et al. .............. 180/65.1
(Continued)

FOREIGN PATENT DOCUMENTS

| JP | 10-306722 | 11/1998 |
| JP | 2000-040535 | 2/2000 |

(Continued)

OTHER PUBLICATIONS

International Search Report corresponding to International Application No. PCT/JP2011/055195 mailed May 10, 2011.
(Continued)

*Primary Examiner* — Naum B Levin
(74) *Attorney, Agent, or Firm* — Myers Bigel Sibley & Sajovec, P.A.

(57) ABSTRACT

To achieve improvement in a vehicle battery cooling device in its effect on the cooling of a battery, and also in its mountability in a vehicle through simplification of a passage structure for the cooling. A structure is such that: an upstream end portion of an air inlet passage for cooling down a battery is opened behind and above a rear seat while an upstream end portion of an air inlet passage for cooling down a charger is opened to a space in front of a lower side of the rear seat; and in a case in which an air conditioning device takes in air from a lower part of a cabin and blows out cool air to an upper part of the cabin, air having cooled down the battery is returned into the cabin through the air inlet passage for cooling down the charger.

1 Claim, 3 Drawing Sheets

(51) Int. Cl.
    *B60L 1/00*         (2006.01)
    *B60L 11/18*       (2006.01)
    *H01M 10/46*      (2006.01)
    *H01M 10/625*     (2014.01)
    *H01M 10/6561*    (2014.01)
    *B60K 1/04*        (2006.01)
    *B60K 1/00*        (2006.01)

(52) U.S. Cl.
    CPC ............ *Y02T10/705* (2013.01); *Y02T 10/7233* (2013.01); *B60K 1/04* (2013.01); B60L 11/1879 (2013.01); *B60K 2001/005* (2013.01); *B60K 2001/0416* (2013.01); *B60L 2240/34* (2013.01)

(56) References Cited

U.S. PATENT DOCUMENTS

| | | | | |
|---|---|---|---|---|
| 5,937,664 | A * | 8/1999 | Matsuno et al. | 62/259.2 |
| 6,188,574 | B1 * | 2/2001 | Anazawa | 361/695 |
| 6,435,293 | B1 * | 8/2002 | Williams | 180/65.1 |
| 7,610,978 | B2 * | 11/2009 | Takasaki et al. | 180/68.5 |
| 8,037,954 | B2 * | 10/2011 | Taguchi | 180/65.1 |
| 8,098,044 | B2 * | 1/2012 | Taguchi | 320/109 |

FOREIGN PATENT DOCUMENTS

| | | |
|---|---|---|
| JP | 2007-153053 | 6/2007 |
| JP | 2008-092624 | 4/2008 |
| JP | 2008-141945 | 6/2008 |
| JP | 2008-221988 | 9/2008 |
| JP | 2010-069990 A | 4/2010 |

OTHER PUBLICATIONS

Office Action corresponding to Japanese Application No. 2012-515779 issued Oct. 3, 2014.

* cited by examiner

← - - - FLOW OF AIR FOR COOLING BATTERY

VEHICLE BATTERY COOLING DEVICE

RELATED APPLICATIONS

This application is a 35 U.S.C. §371 national stage application of PCT Application No. PCT/JP2011/055195, filed on Mar. 7, 2011, which claims priority from Japanese Application No. 2010-114982 filed May 19, 2010, the contents of which are incorporated herein by reference in their entireties. The above-referenced PCT International Application was published as International Publication No. WO 2011/145380 A1 on Nov. 24, 2011.

TECHNICAL FIELD

The present invention relates to a vehicle battery cooling device, and in particular, relates to a vehicle battery cooling device in a vehicle such as a hybrid vehicle equipped with a battery (rechargeable battery) and a charger.

BACKGROUND ART

In recent years, vehicles with concern for the environment, such as hybrid electric vehicles (HEVs) and electric vehicles (EVs), have been attracting attention. These environmentally friendly vehicles are equipped with a battery (rechargeable battery) for supplying drive power to their traction motors, or their power sources. In general, this battery is housed in a case and is disposed behind the rear seat inside the cabin.

Moreover, vehicles equipped with such a battery and the like are equipped with a cooling device which cools down the battery by taking air inside the cabin into the case by means of a cooling fan so that the battery can be prevented from becoming too hot.

CITATION LIST

Patent Literature

[PTL 1] Japanese Patent Application Publication No. Hei 10-306722
[PTL 2] Japanese Patent Application Publication No. 2008-92624

The vehicle battery cooling system according to PTL 1 is configured to discharge air having cooled down a battery to the outside when the temperature of the battery and/or the like becomes equal to or higher than a predetermined value.

The vehicle charging system according to PTL 2 is configured to charge a battery by use of an external power supply while managing the temperature change of the battery due to the charging thereof.

SUMMARY OF INVENTION

Technical Problem

Meanwhile, conventionally, or in PTL 1 described above, an outlet passage through which air that has cooled down the battery returns into a cabin is open behind a rear seat. This causes a disadvantage in that the air having cooled down the battery easily flows into a battery-cooling-air inlet port behind the rear seat.

Moreover, in PTL 2 described above, a charging device which charges the battery by use of an external power supply is provided. Here, a passage to supply air inside the cabin to both the battery and the charging device is required. This causes a disadvantage that the passage structure for the cooling becomes complicated.

Thus, an object of this invention is to provide a vehicle battery cooling device capable of achieving improvement in its effect on the cooling of a battery, and also in its mountability onto a vehicle through simplification of a passage structure for the cooling of the battery.

Solution to Problem

This invention is a vehicle battery cooling device in which a box-shaped case is disposed behind a rear seat in a cabin having an air conditioning device, and a battery and a charger configured to charge the battery by use of an external power supply are disposed in the case, and which cools down the battery and the charger by taking in air inside the cabin into the case through an air inlet passage and which switches between a state in which the air warmed up as a result of cooling down the battery is discharged to an outside of a vehicle and a state in which the warmed air is returned into the cabin, in accordance with an operating status of the air conditioning device, the vehicle battery cooling device characterized in that the vehicle battery cooling device has a structure in which an upstream end portion of an air inlet passage for cooling down the battery is opened behind and above the rear seat while an upstream end portion of an air inlet passage for cooling down the charger is opened to a space in front of a lower side of the rear seat, and in a case in which the air conditioning device takes in air from a lower part of the cabin and blows out cool air to an upper part of the cabin, air having cooled down the battery is returned into the cabin through the air inlet passage for cooling down the charger.

Advantageous Effects of Invention

The vehicle battery cooling device of this invention is capable of achieving improvement in its effect on the cooling of a battery, and also in its mountability onto a vehicle through simplification of a passage structure for the cooling of the battery.

DESCRIPTION OF EMBODIMENTS

This invention achieves the object of improvement in its effect on the cooling of a battery, and also in its mountability in a vehicle through simplification of a passage structure for the cooling of the battery, by using a passage for cooling down a charger, which is not operated during travel of the vehicle, as a passage through which air for cooling down the battery is returned into a cabin during inside air circulation.

Embodiments

FIGS. 1 to 4 show an embodiment of this invention.

Figure 1:
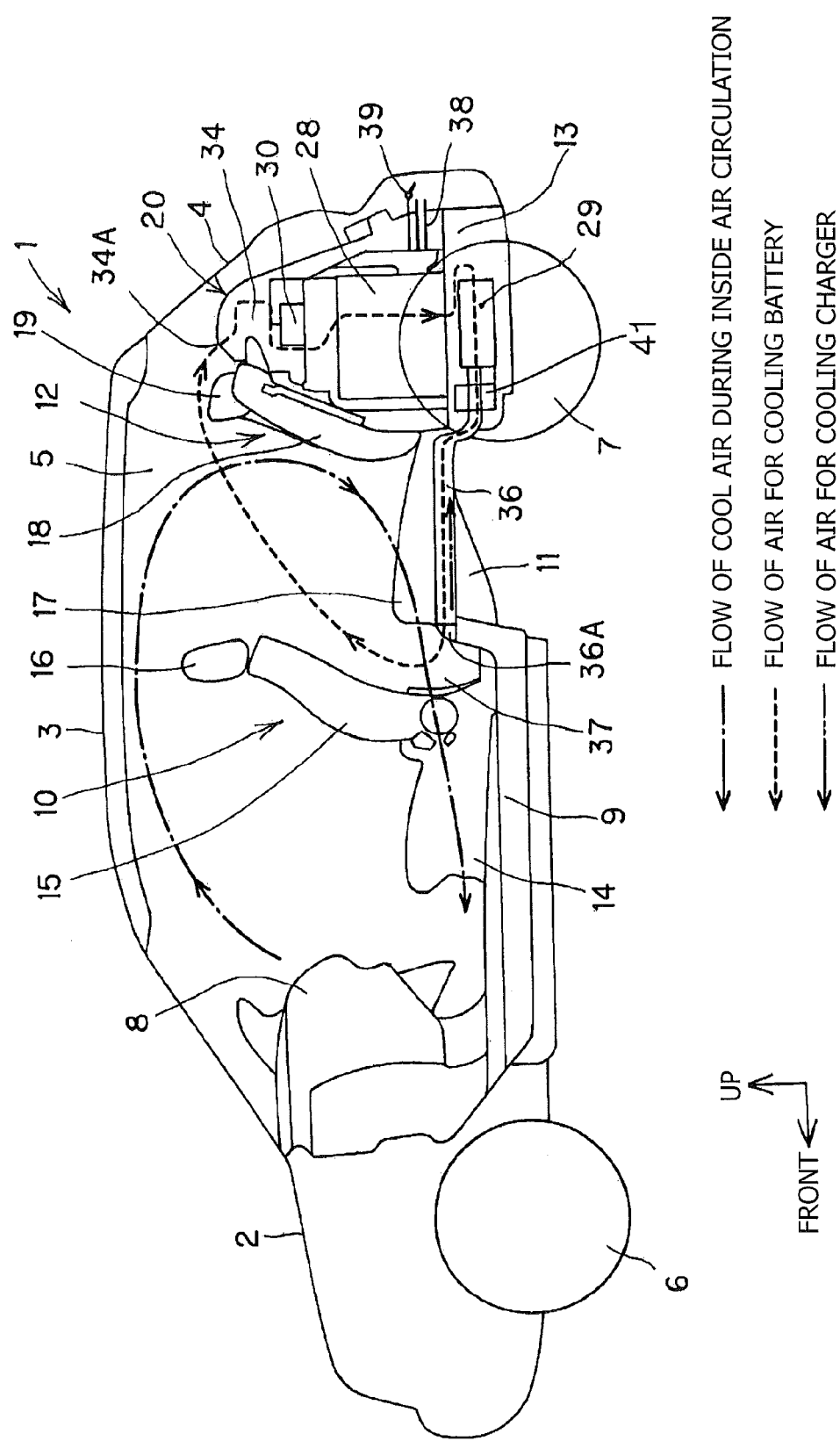
FIG. 1 is a side view of a vehicle showing the flow of cool air during inside air circulation, the flow of air for cooling a battery, and the flow of air for cooling a charger. (Embodiment)

In FIG. 1, reference numeral 1 denotes a vehicle such as a hybrid electric vehicle (HEV) or an electric vehicle (EV); 2, a front hood part; 3, a roof part; 4, a rear door part; 5, a cabin; 6, front wheels; and 7, rear wheels.

The cabin 5 has: an air conditioning device 8 in a front part; moreover a front seat 10 behind this air conditioning device 8 and on a front-seat mounting part 9; further a rear seat 12 on a rear-seat mounting part 11 coupled to the rear of this front-seat mounting part 9; and furthermore a rear floor 13 coupled to the rear of this rear-seat mounting part 11. The front seat 10 is formed of a front seat bottom 14, a front seat back 15, and a front headrest 16. The rear seat 12 is formed of a rear seat bottom 17, a rear seat back 18, and a rear headrest 19.

Figure 2:
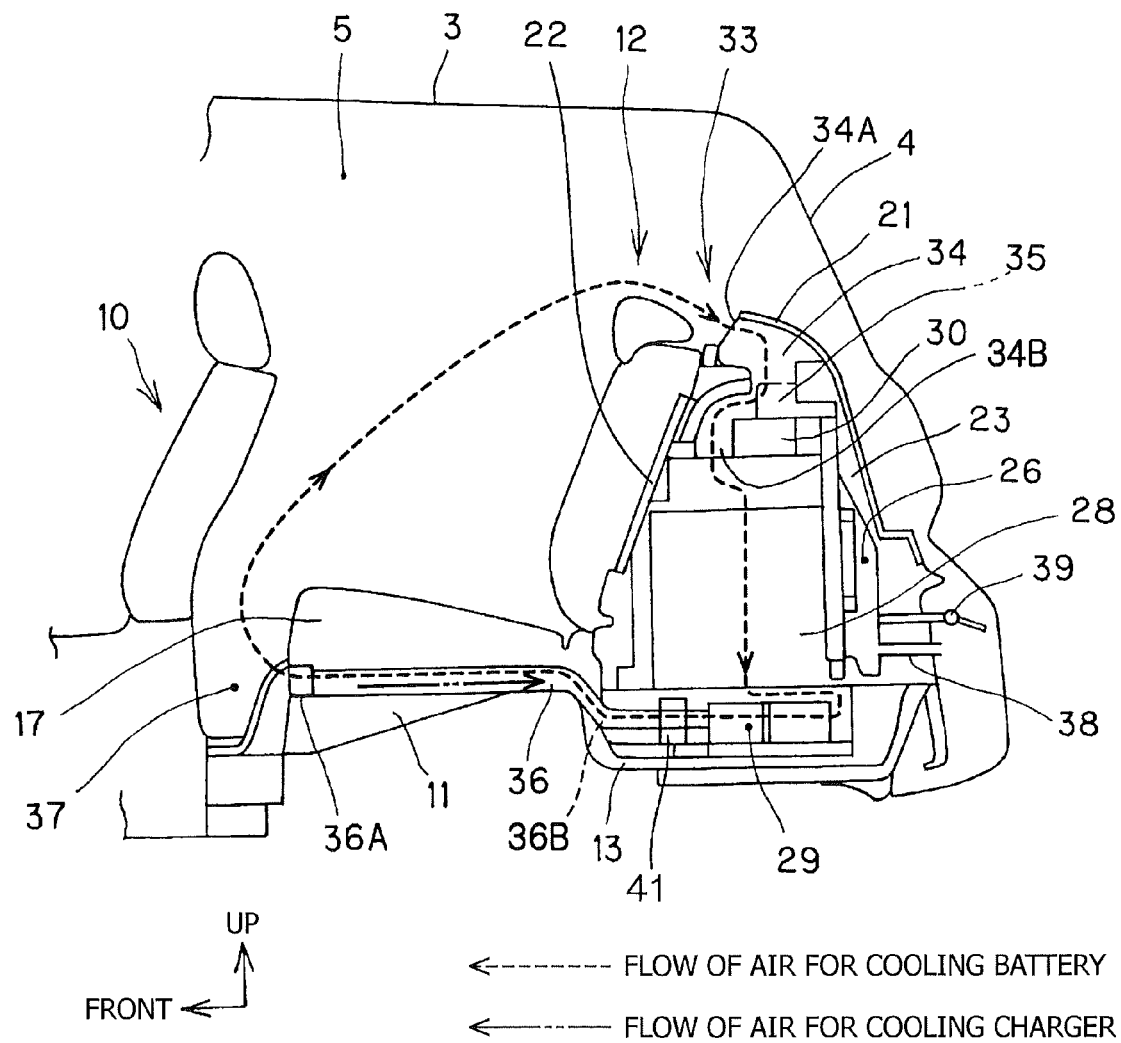
FIG. 2 is a side view of a cooling device. (Embodiment)
Figure 3:
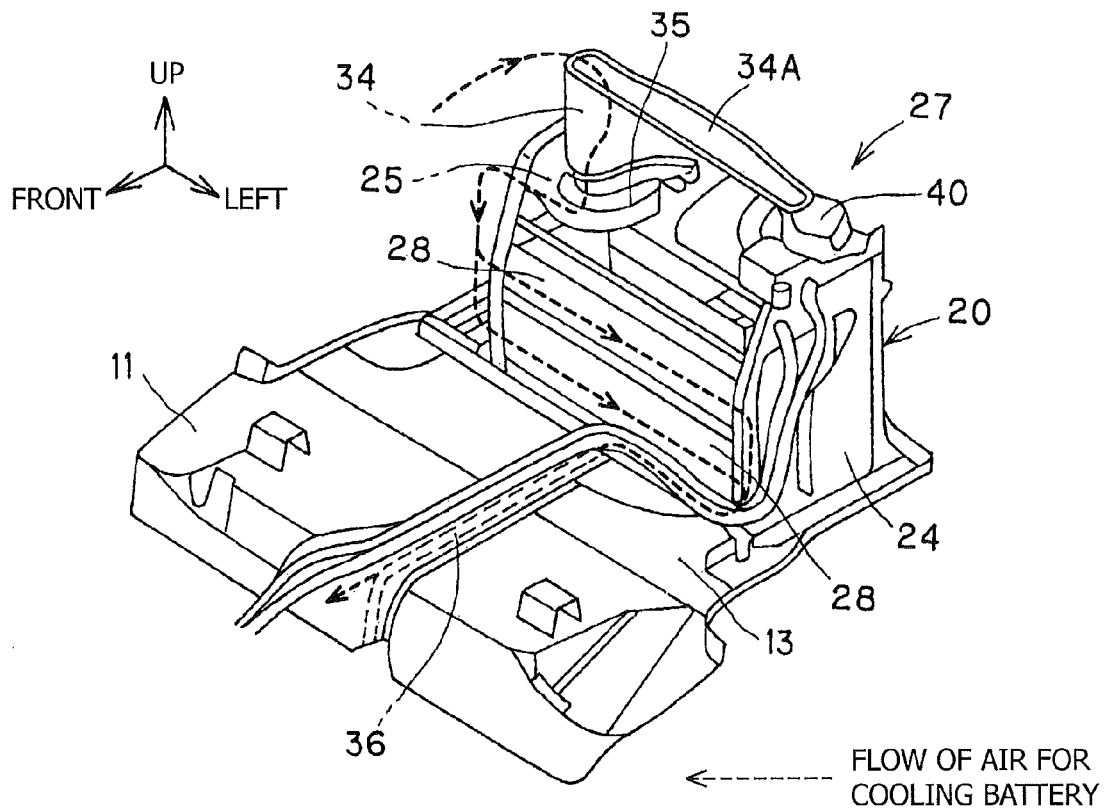
FIG. 3 is a perspective view of a rear part of the vehicle showing the flow of the air for cooling the battery during the inside air circulation. (Embodiment)

As shown in FIGS. 2 and 3, a box-shaped case 20 is disposed behind the rear seat back 18 of the rear seat 12 in the cabin 5. This case 20 is formed of: a rear floor 13 on a lower side; an upper cover 21 on an upper side; a front cover 22 behind the rear seat back 18 of the rear seat 12; a rear cover 23 on a rear side; and a left cover 24 and a right cover 25 disposed respectively on a left side and a right side at both end portions in the vehicle width direction as vehicle body panels. The case 20 forms an isolated case space 26 within the cabin 5.

Inside this case space 26 in the case 20, a battery (rechargeable battery) 28 and a charger 29 which charges the battery 28 by use of an external power supply are disposed as a power supply device 27.

The battery 28 is placed on the upper surface of the rear floor 13. Moreover, a DC/DC converter 30 is placed on the upper surface of the battery 28.

Figure 4:
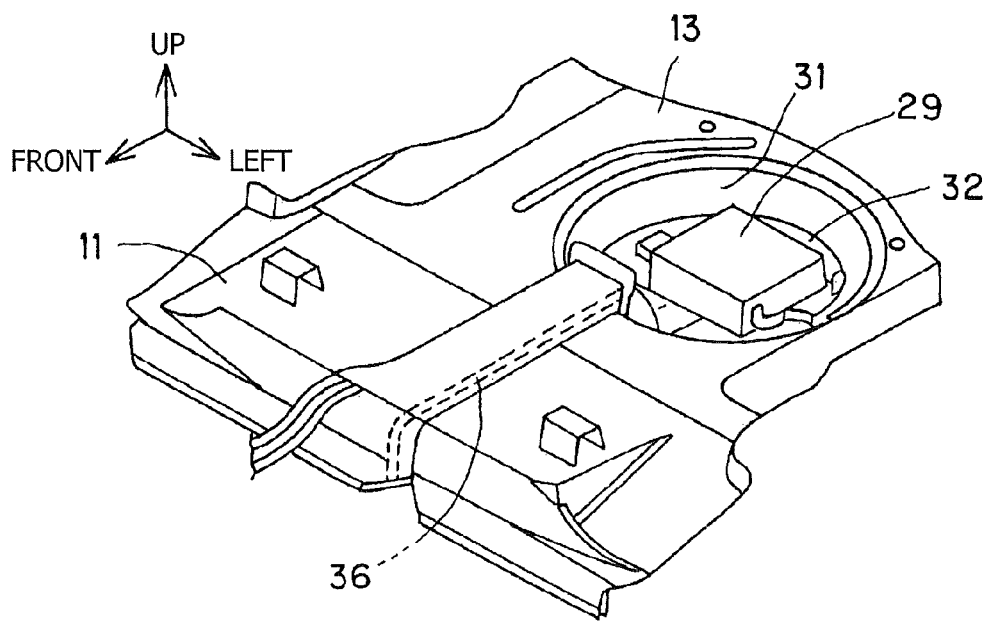
FIG. 4 is a perspective view of the rear part of the vehicle showing the arrangement of the charger. (Embodiment)

The charger 29 is used only while the vehicle 1 is stopped and a charging cable is connected thereto, and is not used while the vehicle is traveling. As shown in FIG. 4, the charger 29 is disposed in a recess 32 formed in a downwardly recessed shape in the rear floor 13 by a stepped portion 31.

Moreover, a cooling device 33 which cools down the battery 28 and the charger 29 is provided in the cabin 5.

Inside the case 20, this cooling device 33 includes: a battery-cooling-air inlet passage 34 formed along the vertical direction behind the rear seat back 18 of the rear seat 12 and above the battery 28; a cooling fan 35 for cooling the battery 28 placed on the upper surface of the DC/DC converter 30; a charger-cooling-air inlet passage 36 formed along a horizontal direction below the rear seat bottom 17 of the rear seat 12; and a cooling fan 41 for the charger 29.

The battery-cooling-air inlet passage 34 has an upstream end portion 34A at one end which is opened from a portion of the upper cover 21 behind and above the rear seat back 18 of the rear seat 12, and has a downstream end portion 34B at the other end which is opened above the battery 28.

The cooling fan 35 is configured to send air inside the cabin 5 through the upstream end portion 34A of the battery-cooling-air inlet passage 34 to the battery 28 side.

The charger-cooling-air inlet passage 36 has an upstream end portion 36A at one end which is opened to a space 37 in front of a lower side of the rear seat bottom 17 of the rear seat 12, and has a downstream end portion 36B at the other end which is opened to the recess 32 in which the charger 29 is disposed. The charger-cooling-air inlet passage 36 guides air (cooling air) (illustrated with a two-dot chain line in FIGS. 1 and 2) from the space 37 to the recess 32 by means of the cooling fan 41 only while the vehicle 1 is stopped and the charger 29 charges the battery 28.

To a lower portion of the rear cover 23, there are attached an air outlet pipe 38 through which to discharge air inside the case space 26 to the outside and an air outlet valve 39 located near this air outlet pipe 38.

Moreover, as shown in FIG. 3, a cooling fan 40 for the DC/DC converter 30 is disposed near the upstream end portion 34A of the battery-cooling-air inlet passage 34.

Meanwhile, this cooling device 33 is configured to cool down the battery 28 and the charger 29 by taking the air inside the cabin 5 into the case 20 through the battery-cooling-air inlet passage 34 and the charger-cooling-air inlet passage 36, and to switch between a state in which the air warmed up as a result of cooling down the battery 28 is discharged to the outside and a state in which the warmed air is returned into the cabin 5, in accordance with the operating status of the air conditioning device 8.

As described, in the cooling device 33, the upstream end portion 34A of the battery-cooling-air inlet passage 34 is opened behind and above the rear seat back 18 of the rear seat 12, while the upstream end portion 36A of the charger-cooling-air inlet passage 36 is opened to the space 37 in front of the lower side of the rear seat 12. Moreover, while the air conditioning device 8 is circulating inside air by taking in air from a lower part of the cabin 5 and blowing out cool air (illustrated with a one-dot chain line in FIG. 1) to an upper part of the cabin 5, the cooling device 33 returns the air (cooling air) having cooled down the battery 28 (illustrated with a chain line in FIGS. 1 to 3) into the cabin 5 through the charger-cooling-air inlet passage 36.

By such a structure, the air warmed up as a result of cooling down the battery 28 is returned through the charger-cooling-air inlet passage 36 into the space 37 in front of the lower side of the rear seat 12, thereby preventing the warmed air from being drawn directly into the battery-cooling-air inlet passage 34.

Moreover, by lengthening the air flow passage, the air warmed up as a result of cooling down the battery 28 can be mixed well with the cool air blown out from the air conditioning device 8, thereby efficiently lowering the temperature thereof, and thereafter, it is taken into the battery-cooling-air inlet passage 34. Accordingly, the performance in the cooling of the battery 28 can be improved.

Further, the charger-cooling-air inlet passage 36, which is not used except during the charging of the charger 29, is utilized as a passage to discharge the air having cooled down the battery 28 into the cabin 5, allowing the elimination of a discharge duct and the like. Thus, the passage structure of the cooling device 33 can be simplified. Accordingly, the mountability of the cooling device 33 in the vehicle 1 can be improved.

Moreover, in this embodiment, as shown in FIGS. 1 and 2, the charger 29 is disposed below the battery 28; the charger-cooling-air inlet passage 36 is disposed below the rear seat 12; and the downstream end portion 36B of the charger-cooling-air inlet passage 36 is opened in front of the charger 29.

By such a structure, in a case in which the air inside the cabin 5 is to be supplied to the charger 29 through the charger-cooling-air inlet passage 36, cool air pooling in a lower part of the cabin 5 can be supplied to the charger 29 while the air conditioning device 8 is not in operation. Accordingly, the performance in the cooling of the charger 29 can be improved.

Moreover, in a case in which the air warmed up as a result of cooling down the battery 28 is to be returned into the cabin 5 through the charger-cooling-air inlet passage 36, the warmed air can be prevented from leaking to the case space 26 behind the rear seat 12. Thus, the temperature of the air to be taken in to the battery-cooling-air inlet passage 34 is reduced. Accordingly, the performance in the cooling of the battery 28 can be improved.

INDUSTRIAL APPLICABILITY

The cooling device according to this invention is applicable to various types of vehicles.

REFERENCE SIGNS LIST

1 Vehicle
5 Cabin
8 Air conditioning device
12 Rear seat
13 Rear floor
20 Case
26 Case space
27 Power supply device
28 Battery
29 Charger
32 Recess
33 Cooling device
34 Battery-cooling-air inlet passage
35 Cooling fan
36 Charger-cooling-air inlet passage
37 Space

The invention claimed is:

1. A vehicle battery cooling device in which a box-shaped case is disposed behind a rear seat in a cabin having an air conditioning device, and a battery and a charger configured to charge the battery by use of an external power supply are disposed in the case, and which cools down the battery and the charger by taking in air inside the cabin into the case through an air inlet passage and which switches between a state in which the air warmed up as a result of cooling down the battery is discharged to an outside of a vehicle and a state in which the warmed air is returned into the cabin, in accordance with an operating status of the air conditioning device, the vehicle battery cooling device characterized in that the vehicle battery cooling device has a structure in which
an upstream end portion of an air inlet passage for cooling down the battery is opened behind and above the rear seat while an upstream end portion of an air inlet passage for cooling down the charger is opened to a space in front of a lower side of the rear seat, and
in a case in which the air conditioning device takes in air from a lower part of the cabin and blows out cool air to an upper part of the cabin, air having cooled down the battery is returned into the cabin through the air inlet passage for cooling down the charger; and characterized in that the charger is disposed below the battery, the air inlet passage for cooling down the charger is disposed below the rear seat, and a downstream end portion of the air inlet passage for cooling down the charger is opened in front of the charger.

* * * * *